Figure 1:
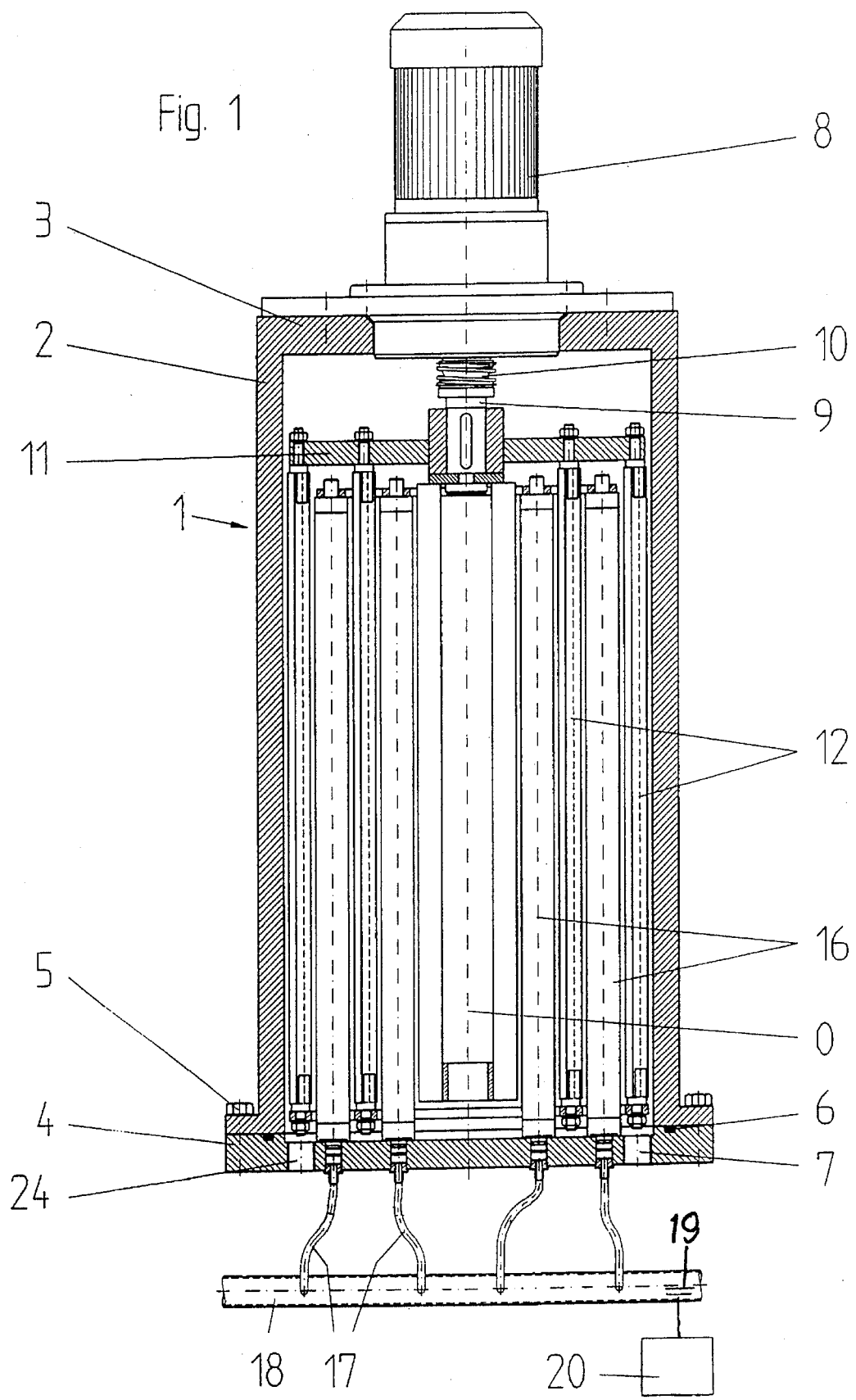

United States Patent [19]

Enderle

[11] Patent Number: 5,505,842
[45] Date of Patent: Apr. 9, 1996

[54] FILTERING APPARATUS HAVING INDIVIDUAL FILTRATE DRAINS AND ROD-SHAPED FILTERS

[75] Inventor: Günther Enderle, Vöhringen, Germany

[73] Assignee: ATEC Automatisierungstechnik GmbH, Neu-ulm, Germany

[21] Appl. No.: 340,726

[22] Filed: Nov. 16, 1994

[30]     Foreign Application Priority Data

Nov. 25, 1993  [DE]  Germany .......................... 43 40 218.6

[51] Int. Cl.⁶ ................................................. B01D 65/10
[52] U.S. Cl. ............................ 210/93; 210/94; 210/96.2; 210/232; 210/321.63; 210/321.89; 210/327
[58] Field of Search ............................... 210/93, 94, 96.1, 210/96.2, 196, 232, 330, 332, 345, 456, 321.63, 321.67, 321.68, 321.89, 321.90, 422, 423, 424, 497.1, 456, 327

[56]         References Cited

U.S. PATENT DOCUMENTS

| | | | |
|---|---|---|---|
| 2,921,686 | 1/1960 | Forman et al. | 210/345 |
| 3,355,382 | 11/1968 | Huntington | 210/321.68 |
| 3,578,175 | 5/1971 | Manjikian | 210/497.1 |
| 3,616,929 | 11/1971 | Manjikian | 210/456 |
| 3,698,559 | 10/1972 | Manjikian | 210/321.9 |
| 3,821,108 | 6/1974 | Manjikian | 210/332 |
| 3,830,372 | 8/1974 | Manjikian | 210/321.63 |
| 3,849,305 | 11/1974 | Manjikian | 210/321.68 |
| 5,328,598 | 7/1994 | Lohrl et al. | 210/96.1 |
| 5,415,781 | 5/1995 | Randhahn | 210/96.2 |

FOREIGN PATENT DOCUMENTS

| | | | |
|---|---|---|---|
| 464321 | 1/1992 | European Pat. Off. | 210/96.2 |
| 7308670 | 12/1974 | Netherlands | 210/321.9 |

*Primary Examiner*—Joseph W. Drodge
*Attorney, Agent, or Firm*—Rosen, Dainow & Jacobs

[57]         ABSTRACT

A filter apparatus comprises a plurality of rod-shaped filter elements disposed within a cylindrical vessel on at least one circular array concentric with the vessel axis, and extending parallel to the vessel axis, said filter elements being mounted in one of the vessel end walls and drained through this vessel end wall. Rotatably mounted in the opposite vessel end wall is a rotor comprising a plurality of agitator elements extending radially spaced from and parallel to the filter elements. The filter elements are provided with individual filtrate drains adapted to be individualy monitored to ascertain the quality of the filtrate. Each filtrate drain may be provided with a valve operable to deactivate the associated filter element in the case of damage thereto.

19 Claims, 6 Drawing Sheets

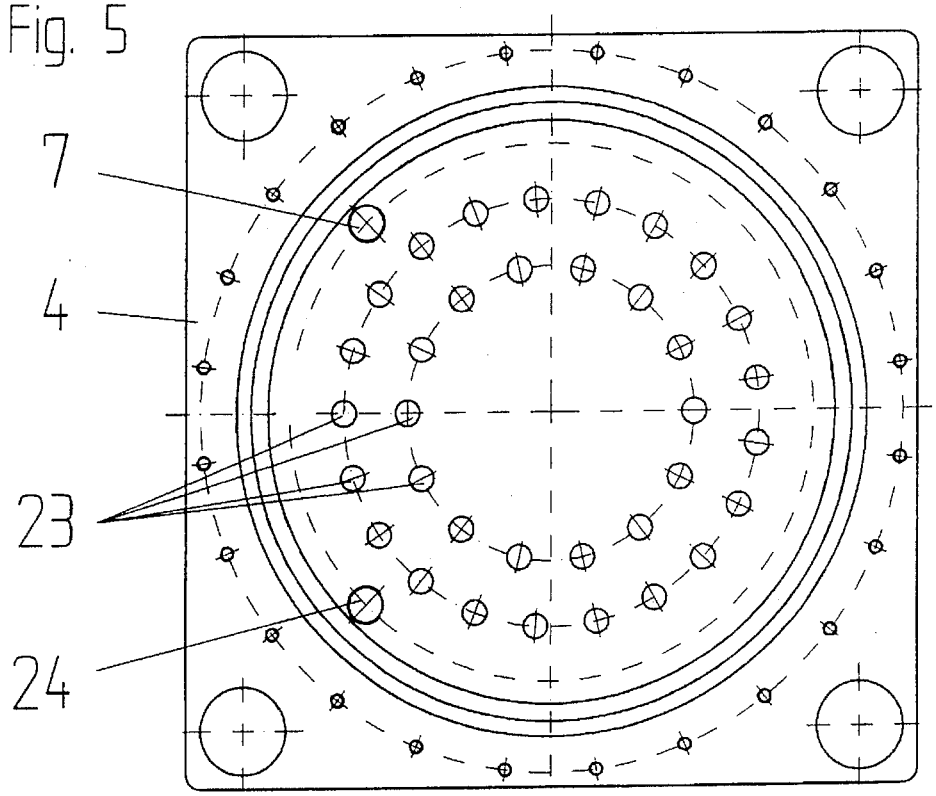
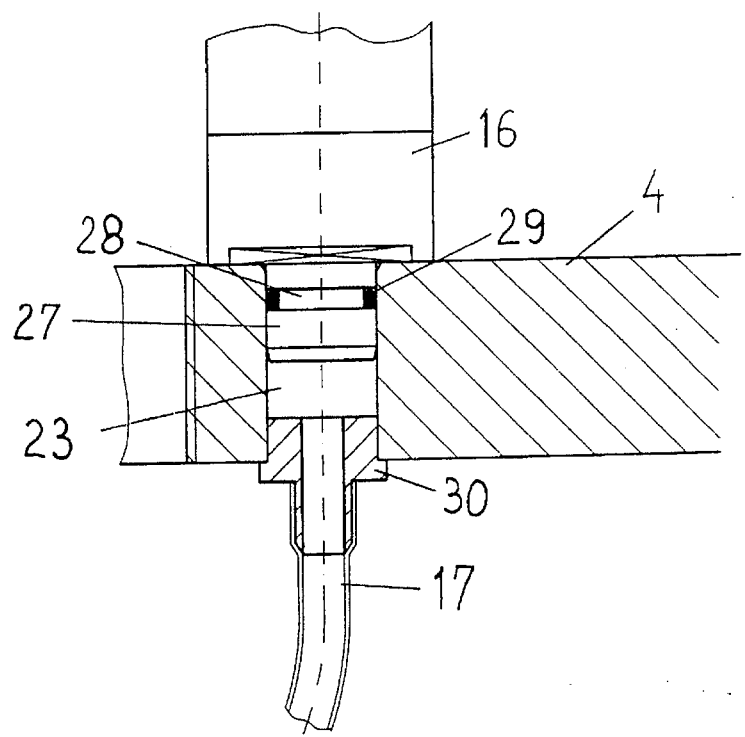

FILTERING APPARATUS HAVING INDIVIDUAL FILTRATE DRAINS AND ROD-SHAPED FILTERS

In the filtration of particle-loaded liquids there arises the problem that solids particles are precipitated on the filter media at a very fast rate, resulting in the build-up of a filter cake and the clogging of the filter membrane, to thereby rapidly reduce the liquid flow through the filter membrane. For this reason one has adopted the cross flow filtering technique, in which a flow component directed parallel to the surface of the filter membrane is generated in the pulp to be filtered to thereby prevent premature precipitation of solid components on the filter membrane.

Known from EP-B-0 178 389 is a filter press apparatus in which the cross flow is produced with the aid of a rotor revolving between two adjacent filter elements, the filter elements consisting of plate-shaped bodies. In a filter apparatus of this type, the operations of mounting and replacing the filter membranes are rather troublesome, since they require the relatively heavy filter elements to be removed from the apparatus.

From EP-A-0 370 118 there is known a filter apparatus using a number of concentrically nested, double-walled rotating filter bodies, with adjacent filter bodies rotating in mutually opposite directions, so that cross-flows are produced about all of the filter bodies. This construction is rather expensive and does not either readily lend itself to facilitating the replacement of the filter membranes on the filter bodies. The filter bodies require individually dimensioned filter membranes corresponding to their different sizes, any given size being represented just once in each filter apparatus. This makes stock-keeping relatively expensive.

The filter apparatus referred to above have in common that the filter bodies have relatively large filter surfaces. In operation it may at any time and purely accidentally happen that the filter membranes are damaged, for instance by the action of foreign bodies contained in the pulp and moved across the filter membranes by the cross flow, resulting in the degradation of the filtration quality, i.e. in the passage through the filter membrane of undesired filtrate components which are then contained in the filtrate, whereby the result of the process is adversely affected or completely invalidated. Additional flaws may be brought about in the production of the filter membranes, or in securing the membranes to their carrier elements, and in many cases such flaws can only be detected in operation, so that it may possibly become necessary to stop the operation of the filter apparatus immediately after having been started.

The known filter press apparatus also have in common that the filtrate chambers of the filter elements are interconnected within the filter apparatus, so that, when the filtrate contains undesired components, it cannot be determined which one of the filter elements has become damaged and requires replacement. By mere visual inspection it is very difficult to detect damages in filter membranes, so that damage of only a single filter element may sometimes require the replacement of the filter membranes on all of the filter elements. This is not only expensive, but results also in extended down-times of the installation as a whole.

It is the object of the invention to provide a filter apparatus of the type defined in the introduction, which is of simple construction and permits satisfactory process results to be still achieved even in the case of damage to individual filter elements.

In the filter apparatus according to the invention, the rod-shaped filter elements are releasably mounted in one end wall of a preferably cylindrical vessel. They are arranged thereon in at least one circular array, and in opposition to this end wall the container, which is additionally provided with means for pressure-feeding thereto a pulp to be filtered, has rotatably mounted therein a rotor consisting of a shaft concentric with the mentioned circular array, a carrier structure extending radially therefrom, and a plurality of agitator elements having one of their ends secured to the carrier structure and extending parallel to the filter elements and radially spaced therefrom. In the case of a cylindrical vessel the above described arrangement is preferably concentric with the vessel's axis. The rotor may be mounted in the end wall opposite to the end wall supporting the filter elements, or in the same end wall.

According to an essential characteristic of the invention, the filter elements are drained through the first-named vessel end wall, so that the filtrate can be monitored in any filtrate drain independently of the remaining filtrate drains. In combination with shut-off valves and/or switch valves it is then possible to deactivate individual filter elements when it is found that they furnish a faulty filtration result, in other words, when the filtrate contains undesired components due to damage of the filter membrane.

The invention is based on the recognition that, although the probability of the filter membranes becoming damaged may be scarce, it is still there, but that in case of damage to only a small number of filter elements, the filtration process can be continued with satisfactory results by totally or partially excluding the affected filter element from the process, for instance by simply closing a valve or by returning the faulty filtrate to the pulp supply. In a filter apparatus containing a great number of filter elements, this will merely result in the overall output of the filter apparatus being reduced by a small fraction, and it will not be necessary to close down the filter apparatus as a whole by reason merely of damage to a single filter element.

The invention moreover permits any filter element requiring replacement due to damage to be accurately localized. A precautionary replacement of all filter element is not required.

In the simplest case, the filtrate quality is only monitored in the filtrate collecting manifold, and when there is reason of doubt, the filtrate is examined in the individual filtrate drains. To this purpose the drains may simply be disconnected from the collecting manifold for analysis of te filtrate flowing therefrom.

It is also possible, however, to provide each filtrate drain with a monitoring device permitting the filtrate flowing therein to be surveyed without disconnecting the filtrate drain from the collecting manifold. In the simplest case the monitoring device may comprise a transparent pipe or hose section in the filtrate drain of each filter element. This will permit the quality of the filtrate to be visually observed. It is also possible, however, to conduct the observation through such a transparent pipe or hose section with the aid of automatically operating electro-optical detectors.

Other monitoring devices are capacitive detectors making use of the fact that the dielectricity constant of the filtrate changes in the presence of undesired filtrate components, or electric resistance measuring devices acting to measure the electric resistance of the filtrate which likewise depends on its solids content. Also useful are viscosimeter devices.

Flow meters may also be advantageously used as individual monitoring devices. They may be employed alternatively or additionally to other individual monitoring devices and permit the filtrate flow to be continuously observed, so that the long-time performance of the individual filter elements can be determined in this manner.

A further advantage not to be underestimated of the invention consists in that the filter elements are held stationary, and that only the rotor has to be dynamically balanced, which may be accomplished and maintained in a relatively simple manner, inasmuch as it is devoid of any components subjected to changes during the filtering process. Finally the servicing of the filter apparatus is also simplified, as the components to be moved during disassembly ar of lesser weight as compared for instance to rotating filter elements having a heavier mass than simple agitator elements.

Figure 2:
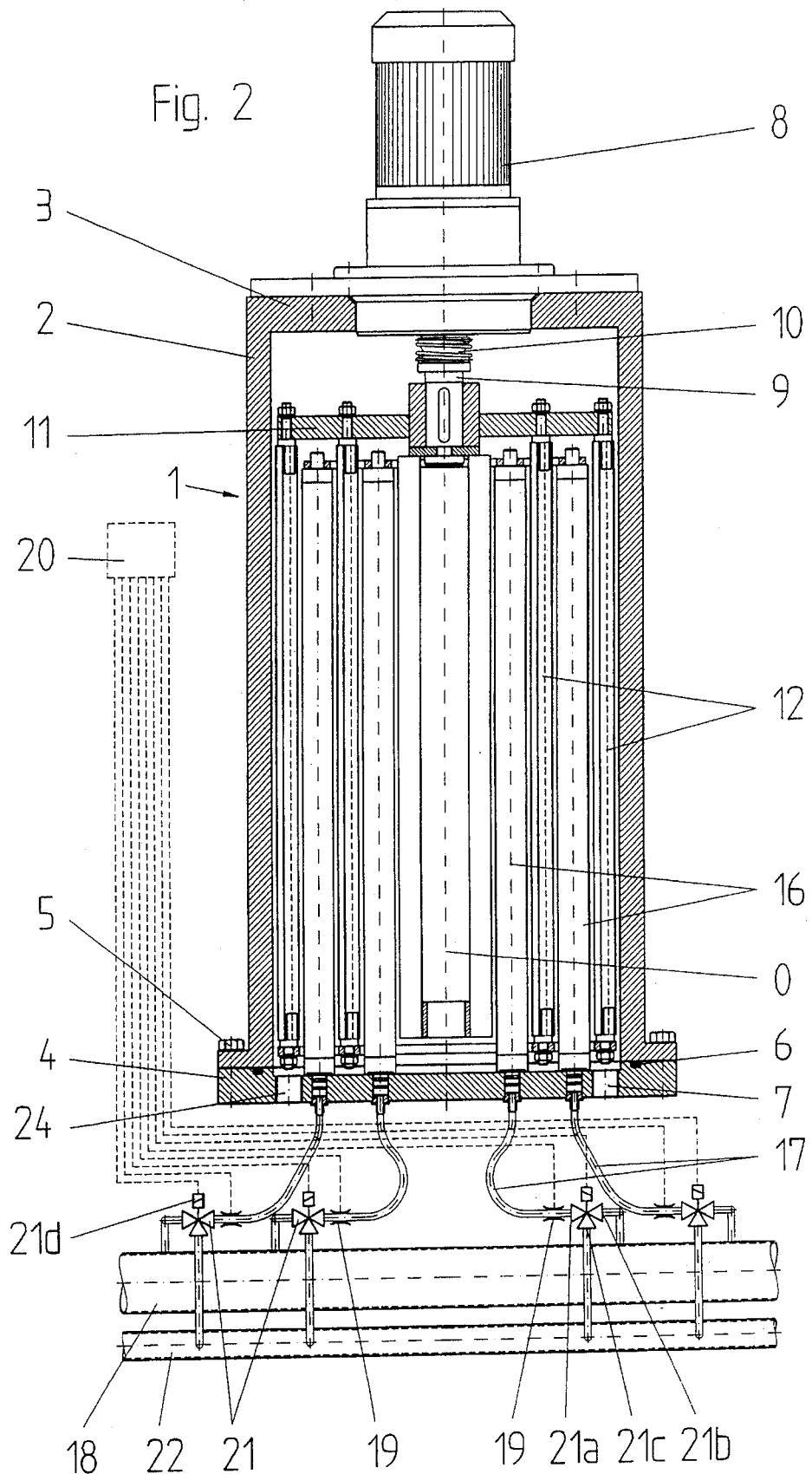
Figure 3:
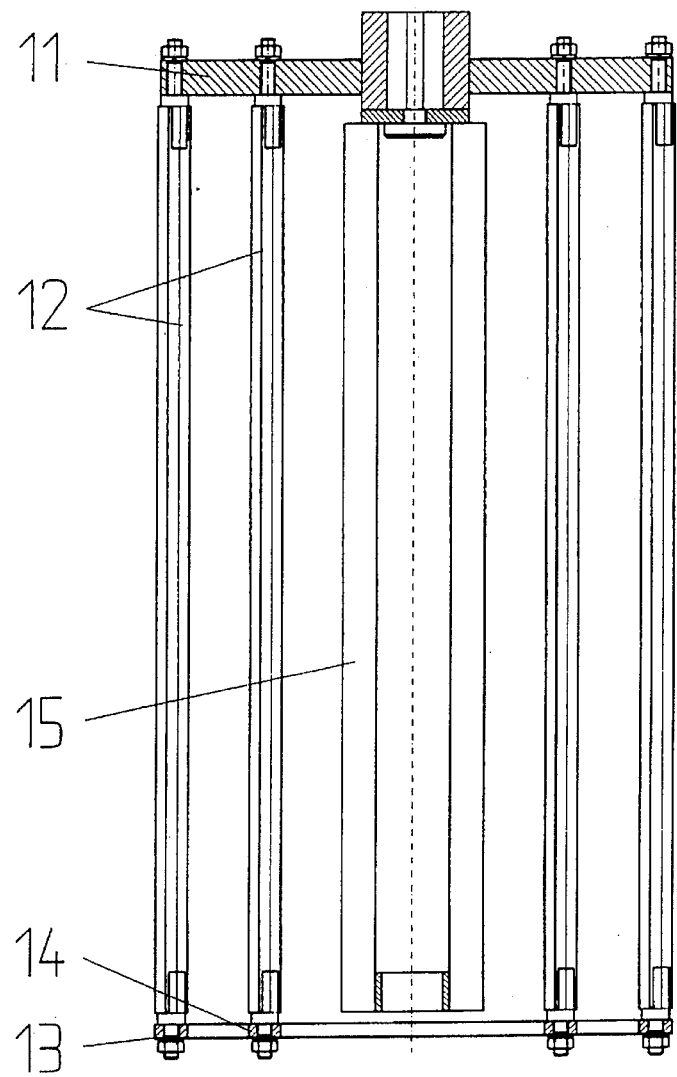
Figure 4:
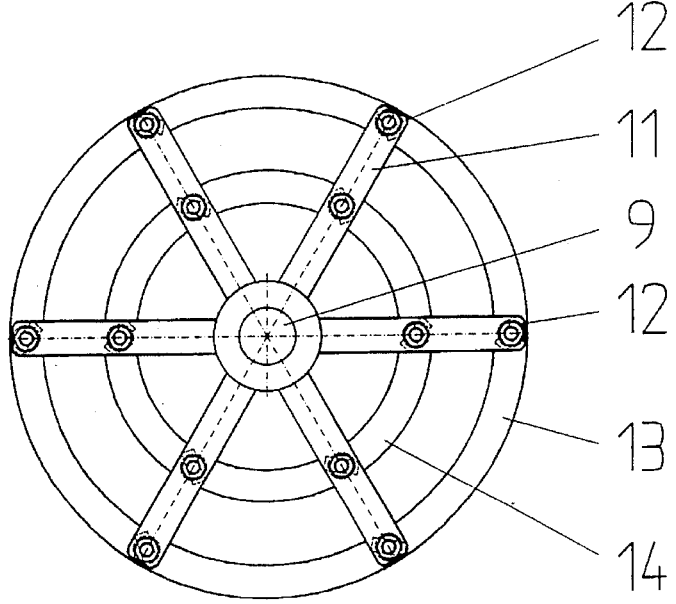
Figure 7:
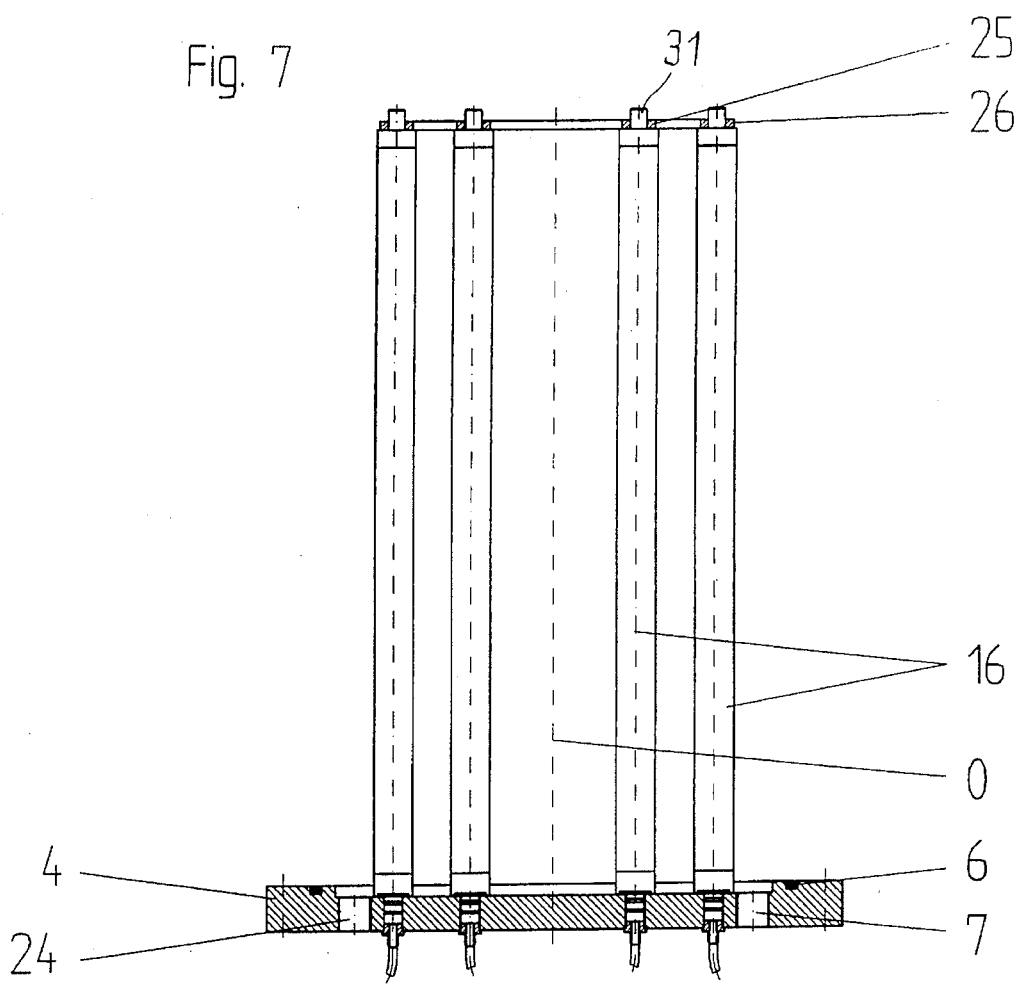
Figure 8:
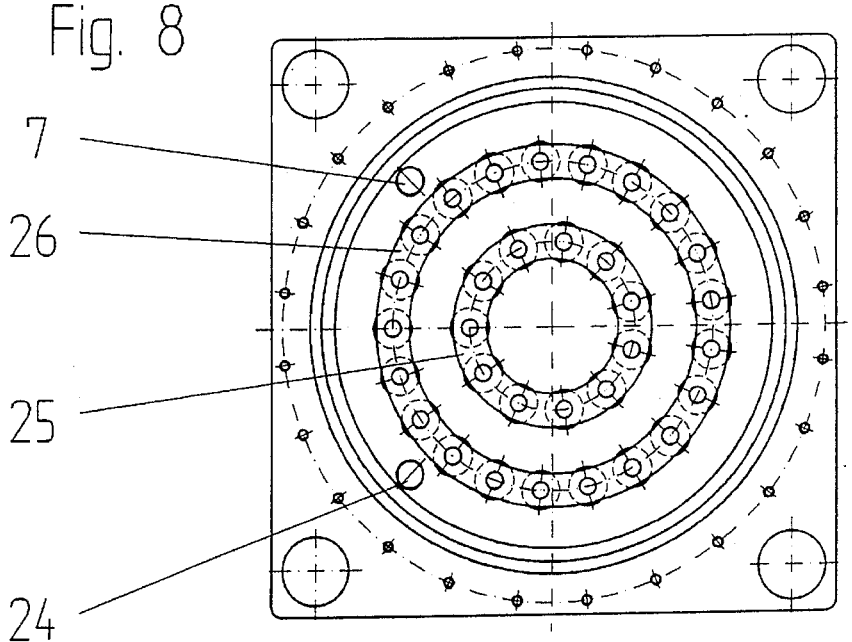
Figure 9:
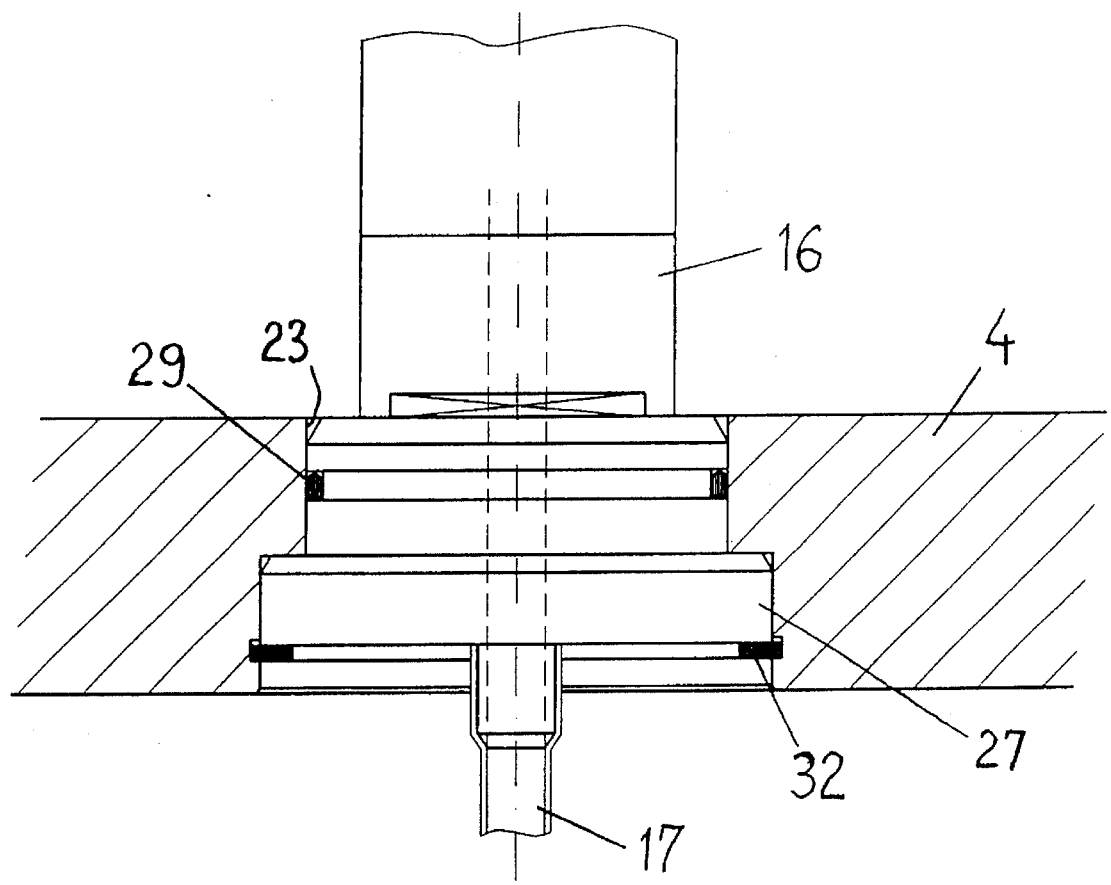

The invention and further advantages thereof shall now be explained in more detail with reference to the accompanying drawings, wherein:

FIG. 1 shows an axial section through a first embodiment of the invention,

FIG. 2 shows an axial section through a second embodiment of the invention with individual monitoring devices in the filtrate drains, FIG. 3 shows an axial section through the rotor of the filter apparatus of FIG. 2, FIG. 4 shows a top plan view of the rotor, FIG. 5 shows a top plan view of the lower vessel end wall of the filter apparatus of FIGS. 1 or 2, FIG. 6 shows a detailed view of the mounting of a filter element in one of the vessel end walls, FIG. 7 shows an array of upright filter elements, FIG. 8 shows a top plan view of the array of FIG. 7, and FIG. 9 shows a detailed view of a filter element mounting.

The filter apparatus shown in FIG. 1 comprises a cylindrical vessel 1 having a cylindrical sidewall 2 formed integrally with a first vessel end wall 3, and opposite thereto a second vessel end wall 4 fixedly connected to sidewall 2 and first end wall 3 by screws 5. An annular gasket 6 provides pressure-tight sealing between sidewall 2 and second end wall 4.

It should be mentioned that the first vessel end wall may also be a separate component similar to the second end wall and releasably connected to the sidewall.

Second end wall 4 is formed with an inlet 7 for feeding a pulp to be filtered, and an outlet 24 permitting the interior of vessel 1 to be flushed. Mounted on first vessel end wall 3 is a motor 8 with its shaft 9 extending into the vessel through an opening in first end wall 3 and sealed in this opening by means of a slide ring seal 10.

Extending radially from shaft 9 as shown in FIGS. 1 to 4 is a carrier structure 11 consisting in the present case of a six-armed spider having a total of twelve agitator elements secured thereto with respective ones of their ends. The agitator elements 12 are disposed on two circular arrays concentric with the axis of shaft 9 and have their other ends connected to a respective one of two rings 13 and 14 acting to absorb centrifugal forces in operation. Further agitator elements 15 may extend in proximity to the axis 0 of vessel 1, with all agitator elements 12 and 15 extending parallel to axis 0.

Mounted in second vessel end wall 4 in two concentric circular arrays is a plurality of rod-shaped filter elements 16. Filter elements 16 are slender and may have circular, elliptic, lentiform or wing-shaped cross-sectional shape. They extend in the axial direction parallel to vessel axis 0, their filtrate chambers being connected through second end wall 4 to a filtrate collecting manifold 18 by individual filtrate drains 17. At their other ends the filter elements 16 of each annular array are secured to a ring 25 and 26, respectively, acting to stabilize the associated array of filter elements.

Filtrate drains 17 are readily disconnectable from collector manifold 18. A filtrate monitoring device 19 disposed in collector manifold 18 is connected to a control unit 20.

The described filter apparatus operates as follows: A pulp to be filtered is pressure-fed to vessel 1 through inlet 7, outlet 24 being closed. The rotor with its agitator elements is rotated, causing the pulp to flow past filter elements 16. As a result, filtrate penetrates the filter membranes and flows through filtrate drains 17 into collector manifold 18. When monitoring device 19 detects a loss of quality in the filtrate, control unit 20 generates a signal. An operator may then successively disconnect filtrate drains 17 from collector manifold 18 and examine the outflowing filtrate to thereby locate the defective filter element 16. The respective filtrate drain 17 may then by clamped shut or connected to the pulp supply container for recirculating the faulty filtrate.

The embodiment according to FIG. 2 differs from that according to FIG. 1 by a monitoring device 19 being provided in each filtrate drain 17 and connected to a control unit 20. Monitoring devices 19 may be capacitive sensors, resistance measuring devices, viscosimeter devices, optical sensors, flow meters or other devices capable of detecting changes in the physical characteristics of the filtrate as brought about by undesired filtrate components. This by the way also applies to the monitoring device in collector manifold 18 according to FIG. 1.

Furthermore in the embodiment of FIG. 2, each filtrate drain 17 is provided with a switch valve 21 having an inlet 21a, a first outlet 21b connected to filtrate collector manifold 18, and a second outlet 21c connected to a return conduit 22. Switch valves 21 are operable by means of solenoids 21d connected to control unit 20.

As shown in FIG. 5, second vessel end wall 4 is formed with a plurality of bores 23 disposed in two circular arrays concentric with vessel axis 0. Each bore 23 is devised to receive a filter element 16 therein, and at the same time serves as a filtrate outlet. Also shown are two larger bores 7 and 24 to be used for filling, draining and flushing vessel 1, and connected in practical use to respective conduits (not shown). It is of essential importance that the rod-shaped filter elements 16 are readily releasable from second vessel end wall 4, so that any eventually defective filter elements can be readily replaced. A particularly advantageous construction for this purpose will be discussed as this description proceeds.

In operation of the filter apparatus, a pulp to be filtered is pressure-fed thereto through inlet 7. The rotor consisting of shaft 9, carrier structure 11 and agitator elements 12 is rotated by motor 8 to thereby produce a pulp flow directed across filter elements 16 for preventing the premature build-up of filter cakes on the filter elements. Each filter element 16 is lined with a hose-shaped filter membrane for filtering the pulp. The filtrate flows through bores 23 into filtrate drains 17 with its quality being monitored by monitoring devices 19. When the filtrate flowing in one of filtrate drains 17 is of inferior quality, the respective monitoring device 19 responds thereto by transmitting a corresponding information to control unit 20 which then acts to supply a suitable signal to solenoid 21d of the corresponding switch valve 21 for actuating it in such a manner that the filtrate from the associated filtrate drain 17 flows into return conduit 22 rather than into filtrate collector manifold 18. In the illustrated embodiment having, as shown in FIG. 5, a total of thirty-five filter elements, the elimination of a single filter element 16 thus results in the reduction of the output of the filter apparatus by merely about 3%.

For the replacement of a filter element 16, screws 5 are removed, and sidewall 2 together with motor 8 and its rotor is lifted off the second vessel end wall, so that filter elements 16 are then readily and freely accessible. The defective filter element 16 previously identified by the associated monitoring device 19 may now be quickly replaced, whereupon the filter apparatus is closed again in a reversed assembly procedure in preparation of its operation being restarted.

In practical use, however, an output reduction by just a few percent will usually be acceptable, and the replacement of filter elements will only be resorted to when the overall output of the filter apparatus has dropped excessively due to failure of a greater number of filter elements.

For the sake of lucidity, the components for feeding pulp to the filter apparatus and the conduit system for returning faulty filtrate from return conduit 22 to the filter apparatus, possibly by way of a pulp supply reservoir, have not been illustrated, inasmuch as one skilled in the art will not require any additional explanations in this regard.

The following discussion shall be directed to certain structural details.

FIG. 6 shows the foot portion of a filter element 16, comprising a tubular socket 27 surrounded by an annular groove 28 retaining an O-ring seal 29. Socket 27 is received in bore 23 in a clamp fit. A hose connector socket 30 is press-fitted or threaded into bore 23 from the outside and has a filtrate drain hose 17 secured thereto.

Since in operation filter elements 16 may be subjected to the action of considerable flow forces, it is not sufficient to retain them only at their foot portions by the insertion of their sockets 27 into bores 23, particularly when they are just plugged in an held in a clamp fit. For this reason it is advantageous to have the other ends of the filter elements disposed in a common circular array retained by a ring provided with a number of bores corresponding to that of the filter elements for receiving therein respective spigots 31 formed on the filter elements. Shown in FIGS. 7 and 8 are a sideview and a top plan view, respectively, of such an assembly comprising two concentric circular arrays of filter elements 16 and two rings 25 and 26. FIG. 7 also illustrates the facility of access to filter elements 16 after removal of vessel sidewall 2.

The replacement of filter elements is accomplished in a particularly elegant manner in the embodiment shown in detail in FIG. 9. In this embodiment the bore 23 in vessel end wall 4, in which a filter element is retained by socket 27, sealed by O-ring 29 and held in place by an expander ring 32, is of a greater diameter than filter element 16, the diameter of which is again smaller than that of socket 27 fitted into bore 23. This construction permits filter element 16 to be pulled outwards through bore 23 after removal of expander ring 32. When filter elements 16 are mounted in the upper end wall of the vessel, i.e. when the apparatus of FIGS. 1 and 2 is designed to operate in an upside down position, the replacement of filter elements will then not even require the pulp to be drained from vessel 1.

In the last-described construction it is required, however, to include a small number, about three to four braces in the circular array of filter elements 16, the braces to have the same length as the filter elements and acting to support the ring 25 or 26, respectively, retaining the other ends of the filter elements 16. In this construction the spigots 31 by means of which filter elements 16 are connected to rings 25 or 26, respectively, are advantageously of conical shape so as to facilitate their insertion into the preferably also conical bores of rings 25 and 26, respectively.

It is finally to be noted that it is also possible to mount the shaft of the rotor in the same end wall of the vessel to which the filter elements are secured.

I claim:

1. A filter apparatus comprising:
   a vessel formed by walls defining an enclosure, said walls comprising at least one end wall;
   means for pressure-feeding a pulp to be filtered to said vessel;
   a rotatable rotor disposed in said vessel adapted to be rotated by drive means,
   said rotor consisting of;
   a rotatable shaft;
   a radially extending carder structure secured to said shaft;
   a plurality of agitator elements having two ends disposed in at least one array relative to the axis of said rotatable shaft and extending parallel thereto, with respective ones of their ends secured to said carrier structure, and;
   a plurality of rod-shaped filter elements having two ends disposed within said vessel in at least one array relative to said axis, and extending parallel to said axis at positions radially spaced from said agitator elements, said filter elements being individually, releasably mounted on one end wall of said vessel;
   a plurality of individual filtrate drains, each individual filtrate drain in fluid connection through one of said end walls with a single rod-shaped filter element.

2. A filter apparatus according to claim 1, further comprising: a filtrate collector manifold in fluid communication with the individual filtrate drains and further having means for monitoring the filtrate quality disposed therein.

3. A filter apparatus according to claim 2, wherein said filtrate drains further include means to interrupt the fluid connections between filter elements and said filtrate collector manifold.

4. A filter apparatus according to claim 1, 2 or 3, wherein the agitator elements disposed in one array have their other ends connected to a common ring.

5. A filter apparatus according to claim 1, 2 or 3, wherein the filter elements disposed on a common array have their other ends retained by a common ring.

6. A filter apparatus according to claim 5, wherein each filter element has its other end provided with a conical spigot inserted into a conical bore in said ring.

7. A filter apparatus according to claim 1, 2 or 3, wherein each filter element has one end provided with a socket in a mechanical and a liquid seal tight relationship with a bore in said one vessel end wall.

8. A filter apparatus according to claim 7, wherein each of said sockets are of a greater diameter than the filter element retained thereby, and is adapted to be inserted into said bore in said one vessel end wall from the outside of said vessel.

9. A filter apparatus according to claim 8, wherein said sockets are each sealed in said bores by means of an O-ring.

10. A filter apparatus according to claim 7, wherein said sockets are each sealed in said bores by means of an O-ring.

11. A filter apparatus according to claim 1, wherein each filtrate drain has disposed therein means for monitoring the quality of the filtrate.

12. A filter apparatus according to claim 2, 3 or 11, wherein said monitoring means is a transparent pipe or hose section.

13. A filter apparatus according to claim 12, wherein said monitoring means is an electro-optical device.

14. A filter apparatus according to claim 2, 3 or 11, wherein said monitoring means is a capacitive sensor.

15. A filter apparatus according to claim 2, 3 or 11, wherein said monitoring means is an electric resistance measuring device.

16. A filter apparatus according to claim 2, 3 or 11, wherein said monitoring means is a viscosimeter.

17. A filter apparatus according to claim 11, wherein each filtrate drain has a shut-off valve disposed therein.

18. A filter apparatus according to claim 11, wherein each filtrate drain has disposed therein a switch valve having an inlet in fluid connection with said respective filter element, a first outlet in fluid connection with a filtrate collector and a second outlet in fluid connection with a pulp return conduit.

19. A filter apparatus according to claim 1, wherein said vessel has a cylindrical cross section, and said axis of said rotor coincides with the cylindrical axis of the vessel.

* * * * *